US009561557B2

(12) United States Patent
Anagnostopoulos

(10) Patent No.: US 9,561,557 B2
(45) Date of Patent: Feb. 7, 2017

(54) METHOD AND SYSTEM FOR THE PRODUCTION OF REINFORCING DOWEL BASKETS FOR CONTRACTING-EXPANDING JOINTS

(71) Applicant: Antonios Anagnostopoulos, Attikis (GR)

(72) Inventor: Antonios Anagnostopoulos, Attikis (GR)

(*) Notice: Subject to any disclaimer, the term of this patent is extended or adjusted under 35 U.S.C. 154(b) by 370 days.

(21) Appl. No.: 14/003,448

(22) PCT Filed: Nov. 28, 2012

(86) PCT No.: PCT/IB2012/056797
§ 371 (c)(1),
(2) Date: Sep. 16, 2013

(87) PCT Pub. No.: WO2013/080142
PCT Pub. Date: Jun. 6, 2013

(65) Prior Publication Data
US 2014/0021185 A1 Jan. 23, 2014

(30) Foreign Application Priority Data
Dec. 22, 2011 (GR) .............................. 20110100721

(51) Int. Cl.
B23K 9/00 (2006.01)
B21F 27/12 (2006.01)
(Continued)

(52) U.S. Cl.
CPC ............... B23K 9/00 (2013.01); B21F 27/125 (2013.01); B21F 27/20 (2013.01); E04C 5/0622 (2013.01)

(58) Field of Classification Search
CPC ......... B23K 9/00; B23K 37/04; B23K 37/047; B23K 2201/00; B23K 2201/32; B21F 27/12; B21F 27/20
(Continued)

(56) References Cited

U.S. PATENT DOCUMENTS 1,390,293 A 9/1921 Johnson
2,613,823 A * 10/1952 Johns ..................... B23Q 7/04
414/626
(Continued)

FOREIGN PATENT DOCUMENTS

AU WO 83/00647 * 8/1982 ............. B21F 15/06
EP 0355776 B1 5/1995
(Continued)

OTHER PUBLICATIONS

PCT-ISR search report and written opinion from priority PCT applicationPCT/IB2012/056797, dated Mar. 7, 2013 (in English).

Primary Examiner — David Angwin
Assistant Examiner — Justin Dodson
(74) Attorney, Agent, or Firm — Andrew F. Young, Esq.; Lackenbach Siegel, LLP

(57) ABSTRACT

Systems and methods for producing dowel baskets from dowel side frames and transverse dowel rods. The dowel side frames are introduced at a top location of the production system, where there is initially introduced a first dowel rod and subsequently, with successive stepwise advancements, the remaining dowel rods are introduced. The dowel side frames with the dowel rods advance on guides that may rotate the dowel side frames relative to the axes of the longitudinal wires so as to impart a desired inclination angle φ relative to the rods. In following, with continuous stepwise advancements, the dowel rods are alternately welded, each to one of the opposed dowel side frames. Transverse wires are welded on the longitudinal wires to impart rigidity to the (Continued)

dowel basket. Subsequently, mass-produced dowel baskets may be stacked in groups.

20 Claims, 17 Drawing Sheets

(51) Int. Cl.
*B21F 27/20* (2006.01)
*E04C 5/06* (2006.01)

(58) Field of Classification Search
USPC ... 219/137 R, 56, 58; 140/112; 228/4.1, 6.1, 228/101, 178, 182
See application file for complete search history.

(56) References Cited

U.S. PATENT DOCUMENTS

| | | | | |
|---|---|---|---|---|
| 4,012,618 A | * | 3/1977 | Ebel | B21L 3/02 219/51 |
| 4,174,475 A | * | 11/1979 | Senn | B23K 11/0086 219/56 |
| 4,291,732 A | | 9/1981 | Artzer | |
| 4,500,763 A | | 2/1985 | Schmidt et al. | |
| 4,526,025 A | | 7/1985 | Ritter et al. | |
| 5,141,274 A | * | 8/1992 | Hayden | B65G 61/00 294/113 |
| 5,446,254 A | | 8/1995 | Ritter et al. | |
| 7,607,210 B2 | | 10/2009 | Anagnostopoulos | |

FOREIGN PATENT DOCUMENTS

| | | |
|---|---|---|
| EP | 1714716 A1 | 10/2006 |
| FR | 2246327 A1 | 5/1975 |
| FR | 2397895 A1 | 2/1979 |
| GB | 1299720 A | 12/1972 |
| GR | 97100509 A | 8/1999 |
| JP | H05-076974 A | 3/1993 |
| WO | 02/066179 A1 | 8/2002 |

\* cited by examiner

Phase A
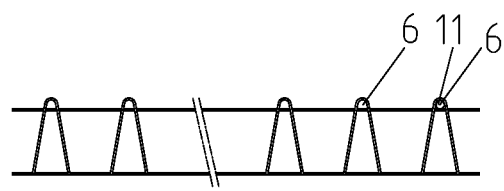
Fig. 2A
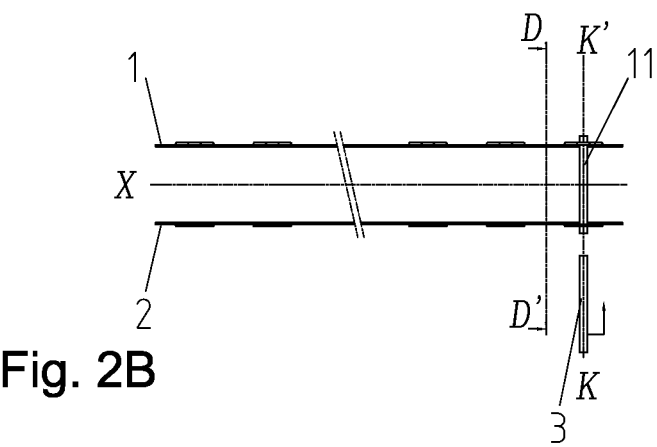
Fig. 2B
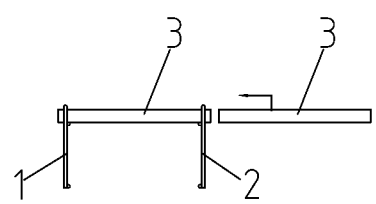
Fig. 2C    Section D-D'

Phase B

Section E-E'

Section F-F'

Phase C

Section G-G'

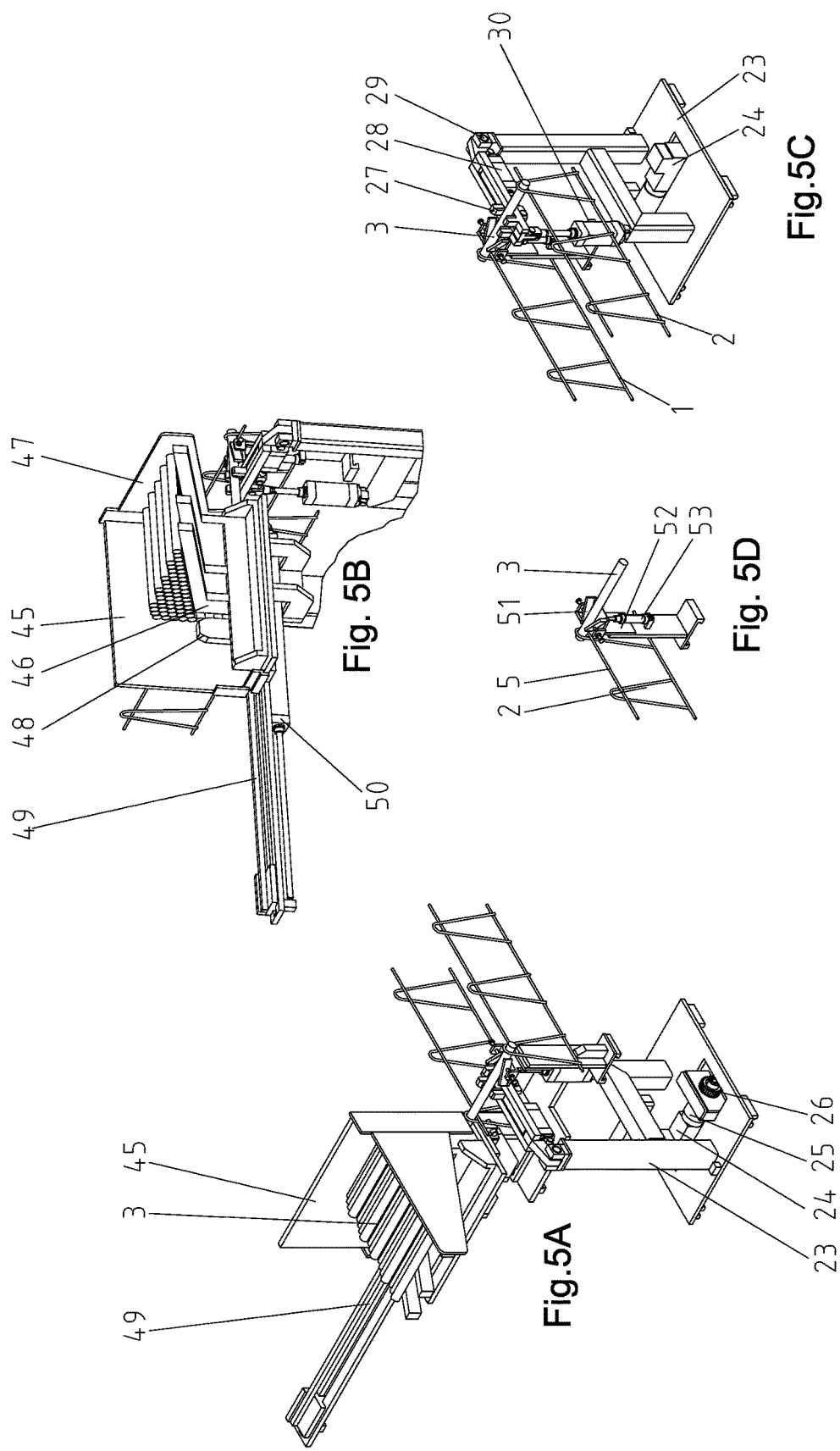

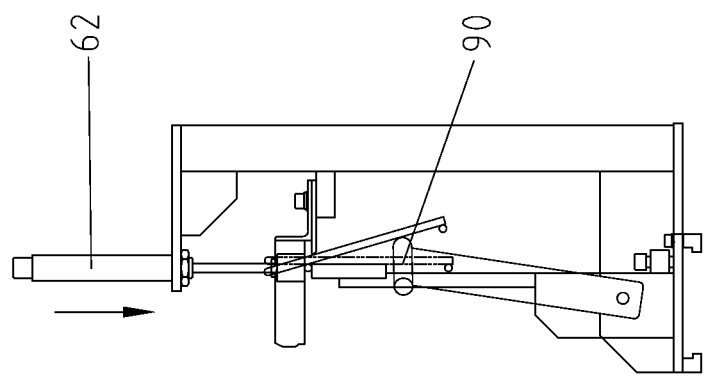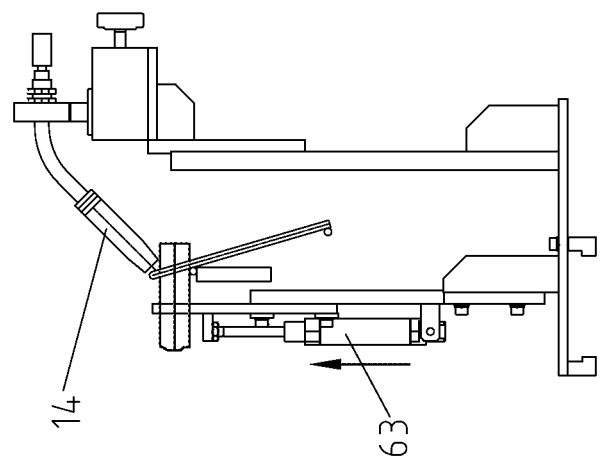

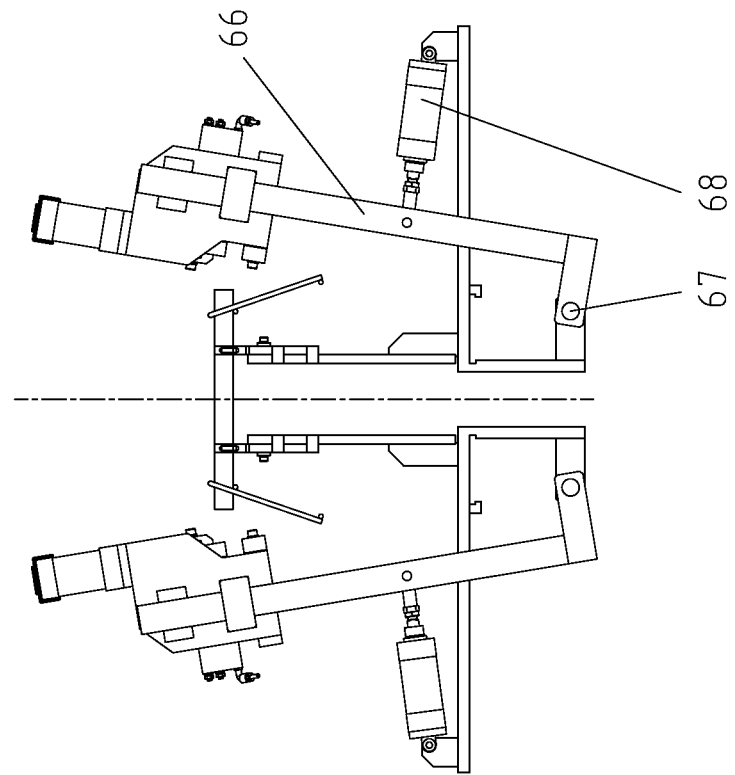
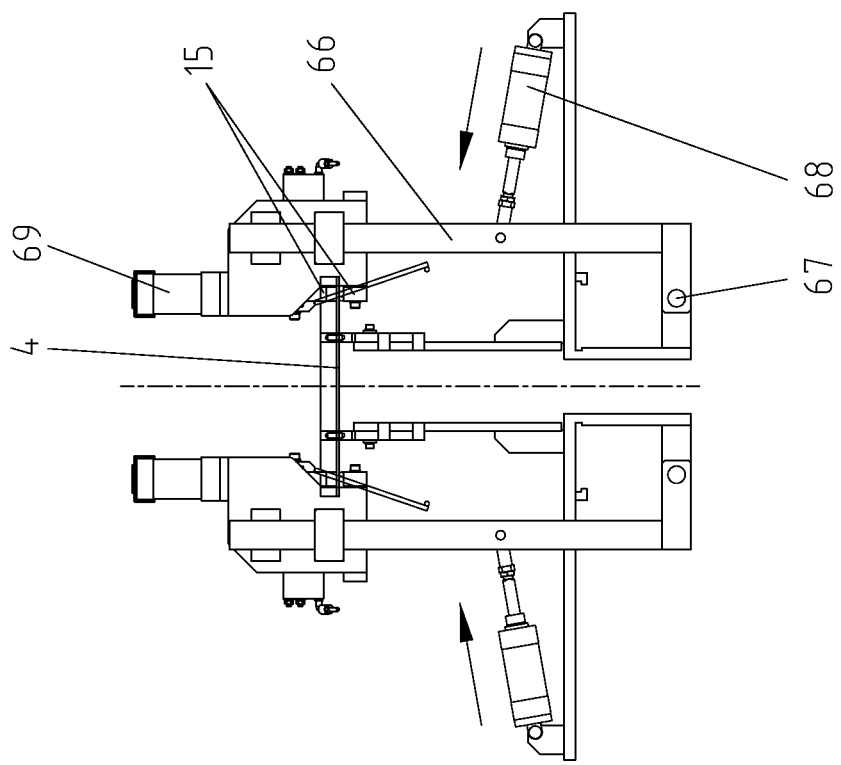
Fig.8C
Fig.8B

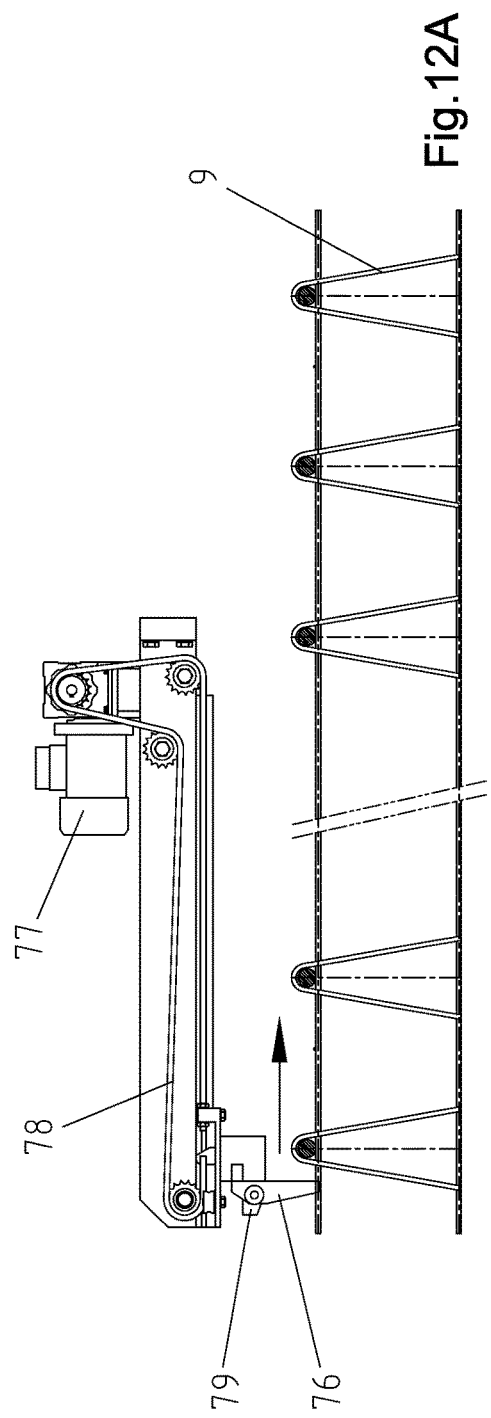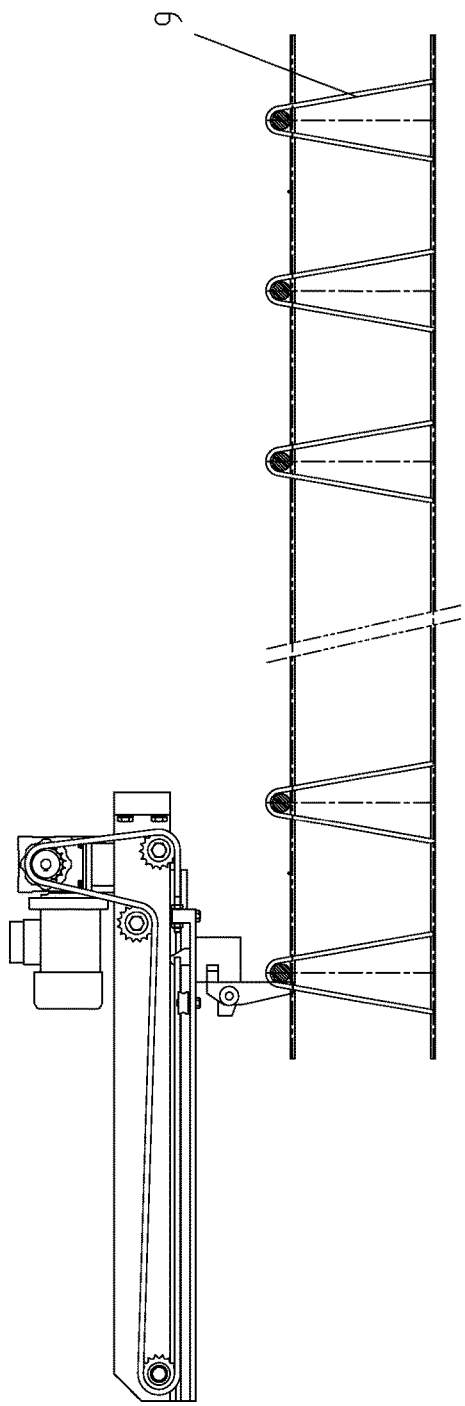

METHOD AND SYSTEM FOR THE PRODUCTION OF REINFORCING DOWEL BASKETS FOR CONTRACTING-EXPANDING JOINTS

This application is a 35 U.S.C. 371 national-phase entry of PCT International application no. PCT/IB2012/056797 filed on Nov. 28, 2012 and also claims benefit of priority to prior Greek national application no. GR-20110100721 filed on Nov. 28, 2011, and Greek national application no. GR-20110100721 and parent PCT International application no. PCT/IB2012/056797, are incorporated herein by reference in their entireties and as to all their parts for all intents and purposes, as if identically set forth in full herein.

TECHNICAL FIELD

The present invention relates to a system and method for the production of dowel baskets from dowel side components and transverse dowel rods. The side components typically have the transverse rods alternately welded on them, each rod being welded to only one of the side dowels, so that each of the side components with the rods that are welded on it may be shifted relative to the opposed cooperating side component. Such dowel baskets typically find use in contracting-expanding joints of reinforced concrete constructions.

BACKGROUND ART

The dowel side components are usually produced at automated machines from source material wrapped on spools. Prior examples of automated machines which are capable of producing dowel side components from source material wrapped on spools include U.S. Pat. No. 7,607, 210B2, where the equivalent terminology "dowel side frames" is used to identify the dowel side components. FIGS. 1A-1C of prior U.S. Pat. No. 7,607,210B2 depict several examples of dowel side components in isolation. FIG. 1D thereof is believed particularly instructive because it depicts an entire, assembled dowel basket in isolation from any machine. It should be readily understood, however, that U.S. Pat. No. 7,607,210B2 disclosed machines which were only capable of producing the dowel side frames, not the completed and assembled dowel basket depicted in its FIG. 1D. This basket employed, as shown, two of the produced dowel side frames. Accordingly, machines disclosed in U.S. Pat. No. 7,607,210B2 were not capable of directly delivering the product depicted in its FIG. 1D.

In the context of FIG. 1D of prior U.S. Pat. No. 7,607, 210B2, assembled dowel baskets with which the present invention is concerned are typically produced from the assembly of such dowel side components. The known and usual practice is manual production of the dowel baskets. Thus, usually for each form of dowel basket there is constructed a particular jig on which the dowel components are manually placed, and where also the dowel rods are manually introduced, so as to then be welded manually at the desired locations, typically using electrical welding. Subsequently, transverse tie wires are also manually welded so as to imbue rigidity to the flexible assembled dowel basket for further handling. As may be understood, with these production practices, various dowel baskets respectively require different production jigs.

SUMMARY OF INVENTION

Technical Problem

This state of the art in dowel basket production, referred to above, presents low productivity with high labor cost, requires large mass of installed jigs, and produces product quality dependent upon the working conditions. The existing state of the art may be understood as disadvantageous in that it is essentially manual, or requires extensive manual intervention.

Solution to the Problem

The invention provides automated systems and methods for the production of dowel baskets from dowel side components and dowel rods. In automated production, dowel components are first introduced at a top or forward location of the production system. Automated production includes a first phase A in which at least a first transverse dowel rod is introduced, and where, with successive stepwise advancements, there may be introduced the remaining dowel rods across the dowel side components. It should be understood that for correspondingly multiplied productivity, simultaneous feeding of the transverse dowel rods at two or more feeding lines may be employed. In addition, with reference to preceding discussion of background art, it should also be understood that the dowel side components may be produced independently from the assembly of the dowel basket, and then may be transported and fed to this first phase A; or may, however, be produced simultaneously at a machine for producing dowel side frames and be synchronously automatically fed toward a system of the present invention. Furthermore, it must be noted that systems and methods for the production of dowel baskets according to the invention are not limited, in phase A, to transverse dowel rods of cylindrical form only. While the transverse dowel rods may be of cylindrical form, they may also be of triangular form, or orthogonal form generally, or prismatic form, and the term "dowel rods" is intended to encompass all of these geometries.

In progression, in a second phase B the dowel side components with the dowel rods assembled thereon are then advanced through guides that permit selected rotation of the dowel side components relative to the axes of the longitudinal wires of the side components, and thus, the dowel side components may assume a desired angle φ relative to the transverse dowel rods. The guides may impart the desired suitable inclination angle φ either passively as suitable guides, or actively via the action of mechanisms.

Continuing in this phase B, in following, with continuous stepwise advancements at particular locations, the dowel rods are welded to the dowel side components at desired locations. Here it should be noted that the welding of the dowel rods on the side components may be made simultaneously at more than two positions for an increase of the productivity, or it may possibly be made by employing just one welding machine that first welds one side and then the other. In any case, the welding of the dowel rods with the longitudinal rods of the dowel side components may be effected by metal deposition welding, by resistance welding, or by any other method of welding. Also during this second phase, typically at least at two locations along the length of the dowel basket transverse wires may advantageously be welded on the dowel side components' longitudinal wires, so as to achieve the rigidity of the basket. These transverse wires may be straightened, cut, and welded, or may be precut and supplied to the welding line via a feeder. The welding of the transverse tie wires may also be effected by resistance welding, deposition welding, or with any other method of welding.

Subsequently to their production through phase B, the produced dowel baskets may be understood as structurally completed and individually ready for end-use. However, when quantities are produced, as in mass production, they may advantageously be stacked in an ordered manner for ease of subsequent handling. This may advantageously be effected by an automated storage collector in an automated third phase C.

In production, the three phases may be executed simultaneously at three different positions, with the welding occurring in the second phase while simultaneously dowel rods are introduced in the first phase and the already-produced dowel basket is stacked in the third phase.

Advantageous Effects of Invention

The present invention provides automated systems that automatically produce dowel baskets from dowel components, with great manufacturing flexibility, high quality, and lower cost. Systems, and the methods they implement according to the invention, may be understood to present significant advantages. For example, in versions of systems according to the invention, the procedures are apportioned and the required automation is simple and of low cost. Versions of systems according to the invention present high productivity limited only by the welding time for the rods, and increasable by the addition of additional welding units. Systems according to the invention tend to minimize the working costs. Systems according to the invention advantageously automate the difficult electrical welding operations. Thus, systems according to the invention advantageously produce dowel baskets of excellent quality due to the mechanized and definable production conditions.

Furthermore, the present invention provides methods that automate the production of dowel baskets while simultaneously maintaining flexibility as to the possible changing of dimensions of the products, and such methods may be understood to present significant advantages. Versions of methods according to the invention may automate production of dowel baskets with integrated procedures within a specified space. The procedures may take place at different stages, utilizing transporting of the to-be-processed materials, and minimizing the necessary automations. Methods according to the invention may advantageously secure high and steady quality of the product, while simultaneously significantly reducing production cost and time.

BRIEF DESCRIPTION OF THE DRAWINGS

Aspects of systems and methods according to the present invention may be understood from the following description and from the attached drawings, wherein systems and methods are presented in an exemplary manner, and where parts which are the same or similar are provided with the same reference numeral labels.

FIG. 1B—a perspective view of an assembled dowel basket with transverse rods.

FIG. 1C—a perspective view of a second form of assembled dowel basket.

FIG. 2A—a schematic side view of a dowel basket in a first phase of production.

FIG. 2B—a schematic plan view of a dowel basket in a first phase of production.

FIG. 2C—a schematic sectional view taken at section DD' of FIG. 2B.

FIG. 2D—a schematic side view of a dowel basket in a second production phase.

FIG. 2E—a schematic plan view of a dowel basket in the second production phase.

FIG. 2F—a schematic sectional view taken at section EE' of FIG. 2E.

FIG. 2G—a schematic sectional view taken at section FF' of FIG. 2G.

FIG. 2H—a schematic side view of stacked dowel baskets.

FIG. 2I—a schematic plan view of the stacked dowel baskets of FIG. 2H.

FIG. 2J—a schematic end view in the direction GG' of FIG. 2I.

FIG. 5A—a detailed elevation view of the dowel rod feeder.

FIG. 5B—a rotated elevation view of the upper portion of FIG. 5A.

FIG. 5C—a detailed elevation of the carrier with dowel rod guide and gripper arrangement.

FIG. 5D—a magnified elevational isolation view of the receiver guide arrangement for rods.

FIG. 7B—a sectional elevation depicting one side of the view of FIG. 7A.

FIG. 7C—a longitudinal section view detailing a welding head location, similarly as in FIG. 2F.

FIG. 7D—a detailed longitudinal section view of mechanisms acting on the dowel side components, similar to FIG. 6B.

FIG. 8B—depicts the transverse tie wire welders engaged on the dowel side components.

FIG. 8C—depicts the transverse tie wire welders disengaged.

FIG. 9B—a side view of a second advancement carrier.

FIG. 11B—a second side view of details of stacking mechanisms for prepared dowel baskets.

FIGS. 12A-12B—isolation side views of the dowel basket transport push arm operation in different positions.

DESCRIPTION

In following are presented description of exemplary implementation of systems and processes in the sense of non-limiting examples.

Figure 1A:
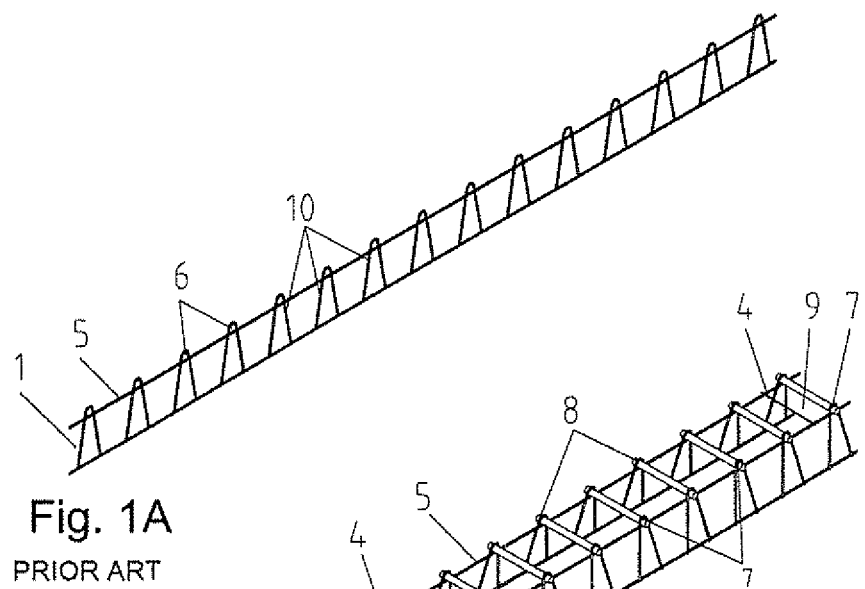
FIG. 1A—depicts a dowel side component (side frame) in isolation.
Figure 1B:
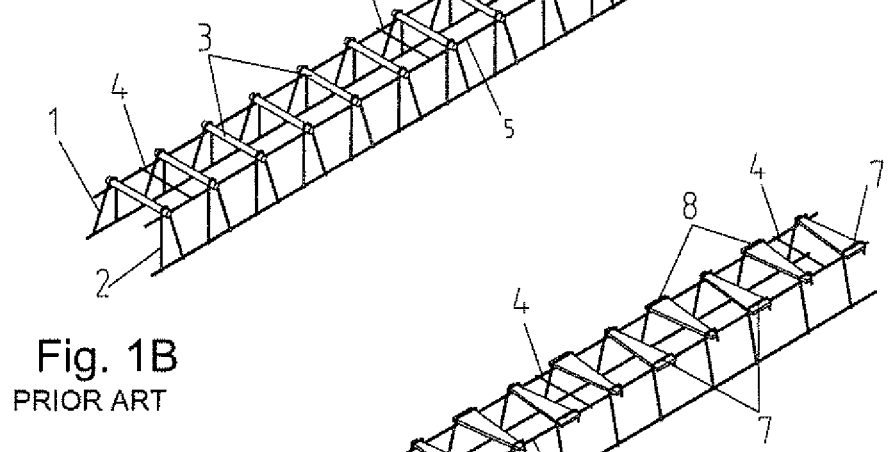
Figure 1C:
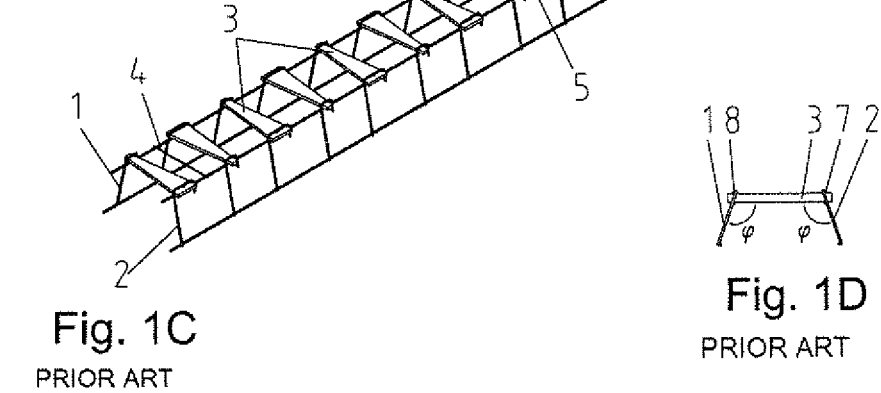
Figure 1D:
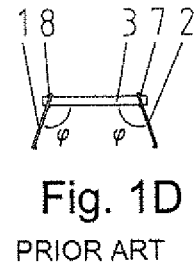
FIG. 1D—an end view of the dowel basket depicted in FIG. 1B.

Considering FIGS. 1B-1D, a system produces dowel baskets 9 from dowel side components 1, 2 dowel rods 3 and connecting wires 4.

Figure 3:
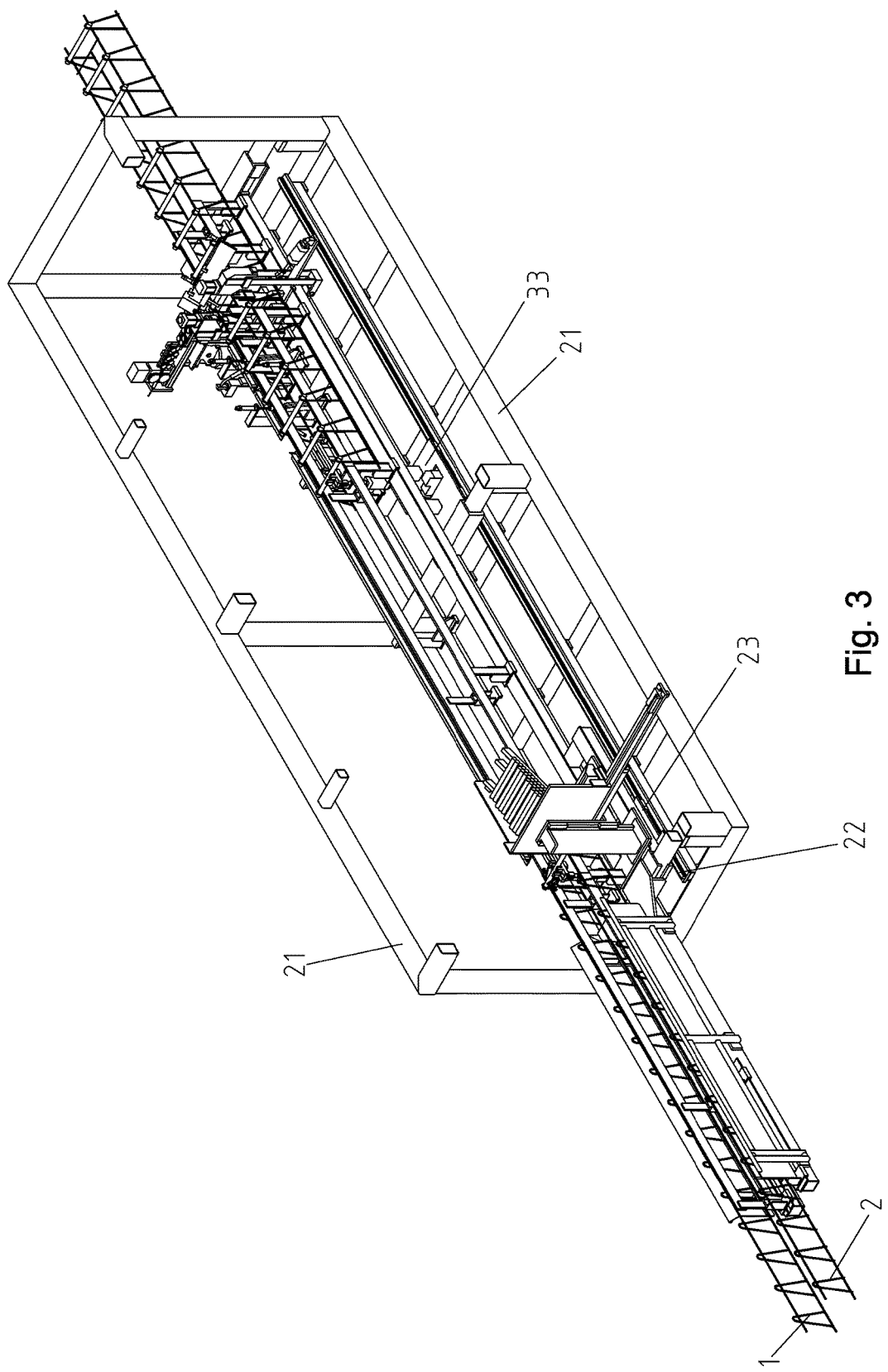
FIG. 3—a perspective view of a dowel basket machine.
Figure 9A:
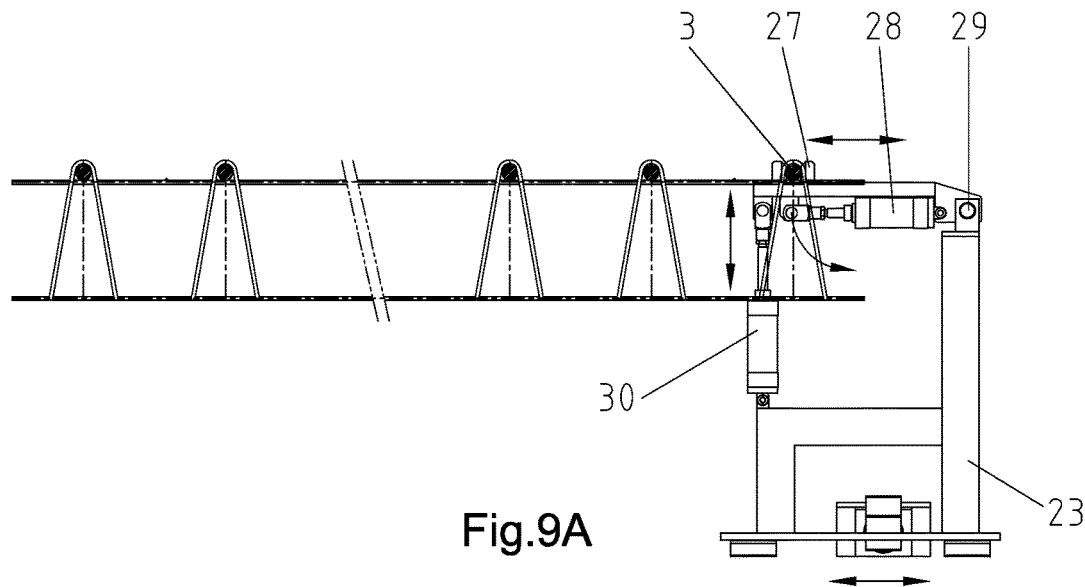
FIG. 9A—a side view of a first advancement carrier.

As depicted in FIG. 3, an exemplary system includes a metallic structure 21 along the length of which there are developed versions of machines for the working phases A, B previously discussed. Along the length of the construction 21 exist linear guides 22 and a toothed rack gear. With further reference to FIGS. 5A and 5C, as well as FIG. 9A, carrier 23 moves on the guides 22 by action of the drive 24 via the reducer transmission 25 and the gear 26. The carrier 23 has an arrangement of a gripper 27 which may grasp the dowel rods 3 of the dowel basket 9. The gripper 27 is energized by an air cylinder 28, and the entire gripper 27 is seated on a joint 29 so that the action of an air cylinder 30 brings it to the level of the rods 3. Conversely, with the deenergization of the air cylinder 30 it sinks below the level of the rods 3. This carrier 23 is dedicated to the relocation of the assembled side components 1,2 and the rods 3 in the working phase A, that is, at the introduction of the dowel rods 3 into the dowel side components 1,2.

Figure 9B:
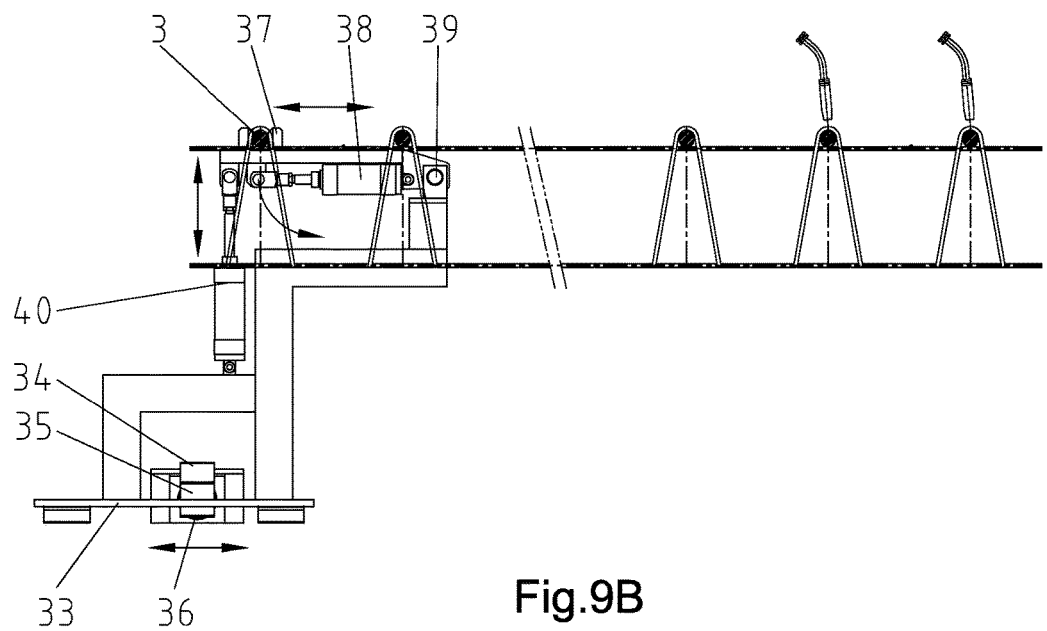
Figure 10:
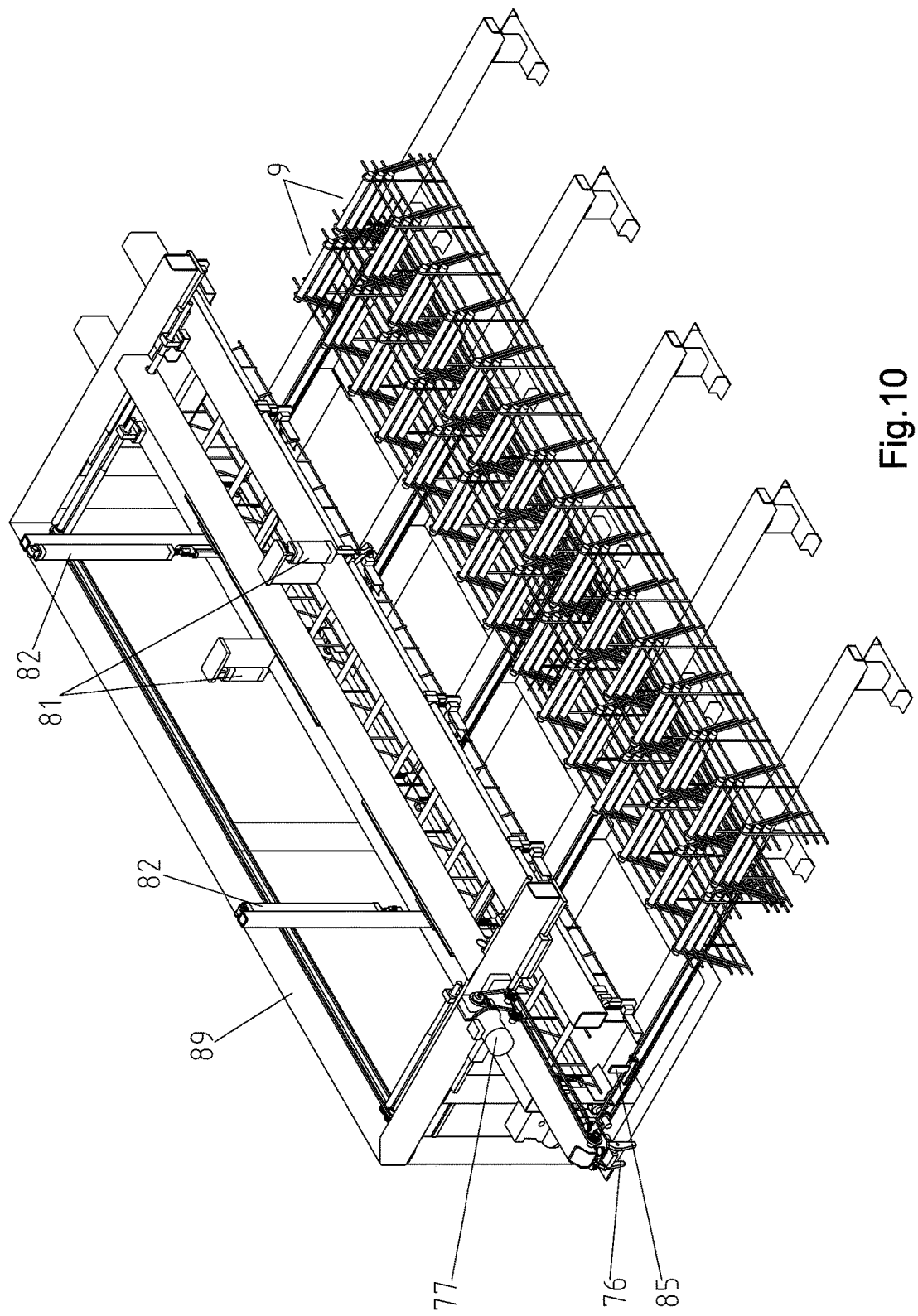
FIG. 10—a removed elevation view of a dowel basket stacking system.

Again with reference to FIG. 3, and having further reference to FIG. 9B, a second carrier 33 similarly on guides also has arranged a gripper 37 energized by an air cylinder 38. The gripper 37 is seated on a joint 39 and via the action of an air cylinder 40 rises to the level of the dowel rods 3. The second carrier 33, as discernible from FIG. 3, is dedicated to the movement of the dowel side components 1, 2 and the rods 3 in the working phase B, that is, the phase including the welding of the dowels 3 on the longitudinal rods 5 of the side components 1, 2. This carrier 33 moves by action of motor 34 through the reducer transmission 35 and the gear 36.

With reference to schematic FIGS. 2A-2C, the introduction of rods 3 occurs at position KK'. In the non-schematic views of the exemplary machine 21 as given by FIGS. 3-4 and 5A-5B, the rods 3 are stored between the stationary plate 45 and the guides 46. Along their length the rods 3 are confined by the plate 47 and the side guide 48. A push rod 49 is driven by an air cylinder 50 and supplies the rods 3 through the dowel side components 1, 2. In this feeding line KK' and at the side of the dowel component 2 which is opposite from the feeding mechanism for rods 3, there is a suitable receiver 51 for the rods 3, as the rods 3 pushed by the push rod 49 must pass on the upper side of the side components' longitudinal wires 5. As shown in detail in FIG. 5D, this receiver 51 is seated on a guide 52 and is elevated by the action of air cylinder 53 during the duration of the feeding of the rods 3. With the completion of feeding the receiver 51 is removed lower so that the dowel side components 1, 2 may be advanced with the rods 3 situated on them.

Figure 4:
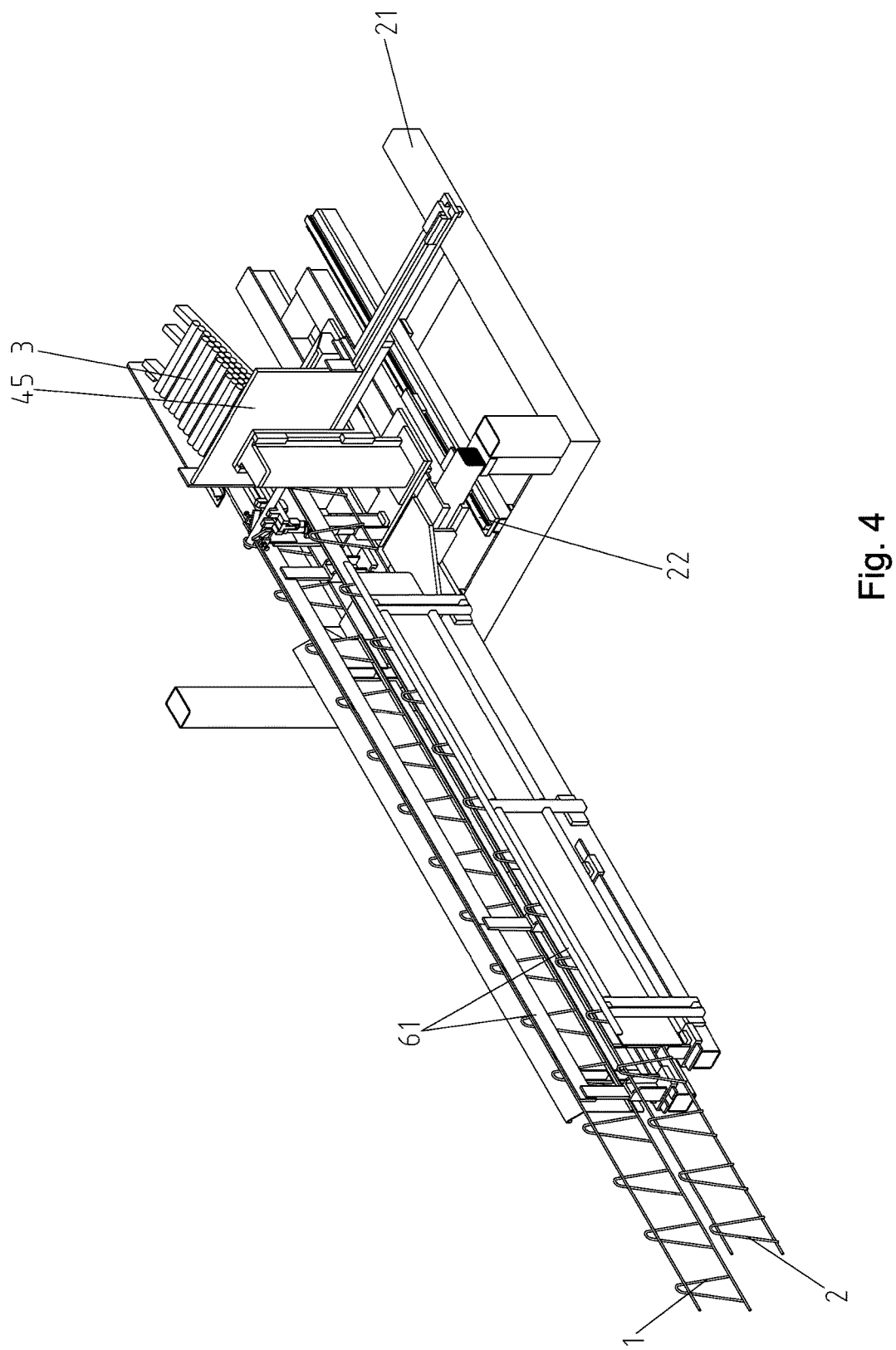
FIG. 4—a magnified perspective view of a forward portion of FIG. 3.

Turning to FIG. 4 in magnifying the part of the view of FIG. 3, it may be understood that to enter the feeding line KK', the two dowel side components 1, 2 are placed on guides 61 and move symmetrically relative to the axial plane of the machine 21. They are initially placed on the guides 61 and pushed until the first receivers 6 of the shaped wires are found at the feeding line KK' of the rods 3.

Figure 6B:
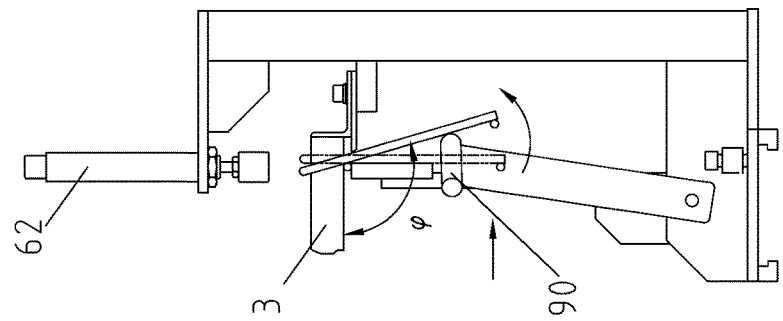
FIG. 6B—an end view depicting a rotation mechanism for a side component.
Figure 6A:
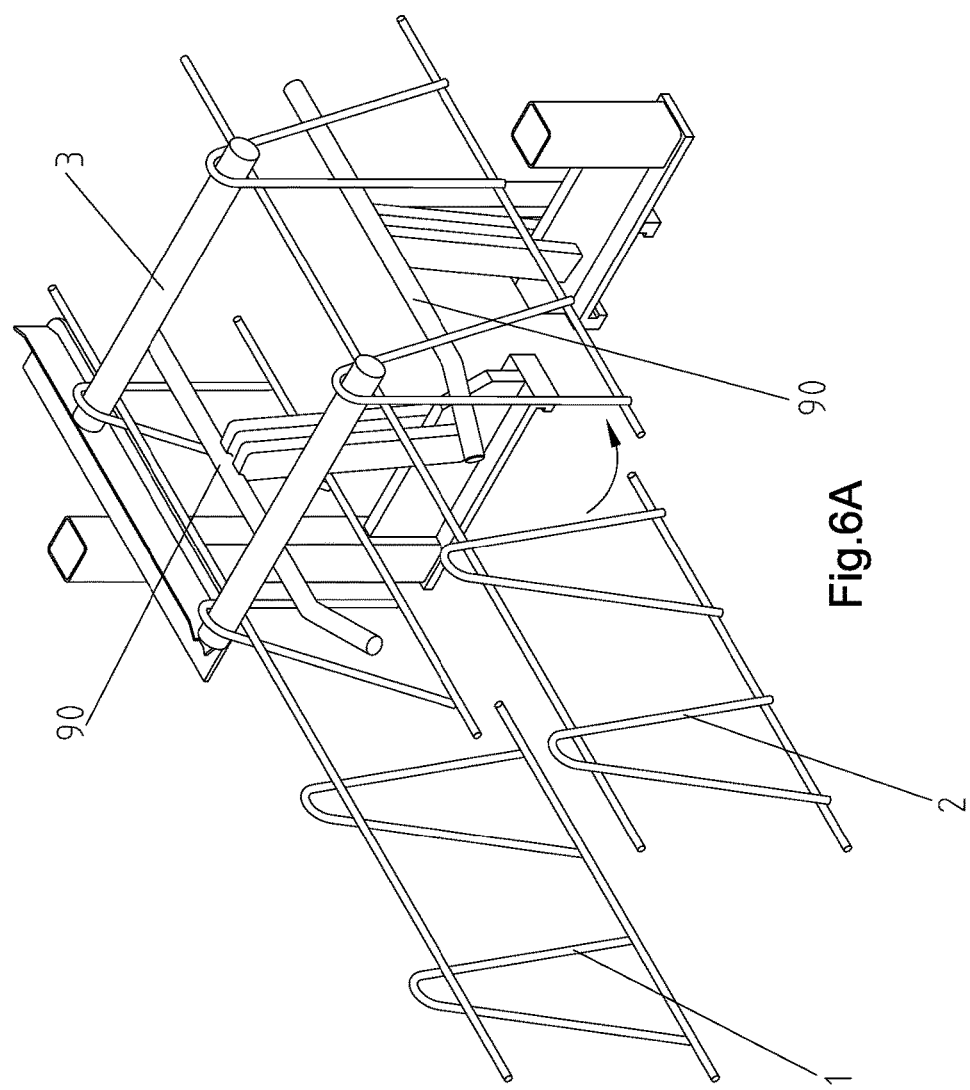
FIG. 6A—an elevation view depicting details of the side component rotation mechanisms.

Turning to FIGS. 6A-6B, during the transport of this intermediate product, which is composed of dowel side components 1,2 and dowel rods 3 on them, from the phase A towards the phase B, the axes of the longitudinal wires 5 is maintained, and under the action of the guides 90 the dowel side components 1, 2 are rotated relative to the axes of the longitudinal wires 5 so that the desired angle φ is acquired. While the guides 90 depicted in FIGS. 6A-6B and 7D are depicted as active guides in this exemplary version, it was previously explained that the guides may impart the desired suitable inclination angle φ either actively via the action of mechanisms as depicted, or passively as suitable guides.

Figure 2D:
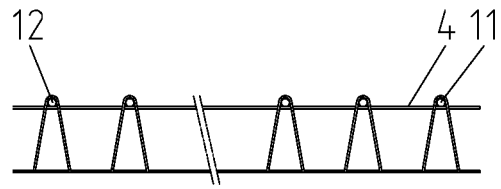
Figure 2E:
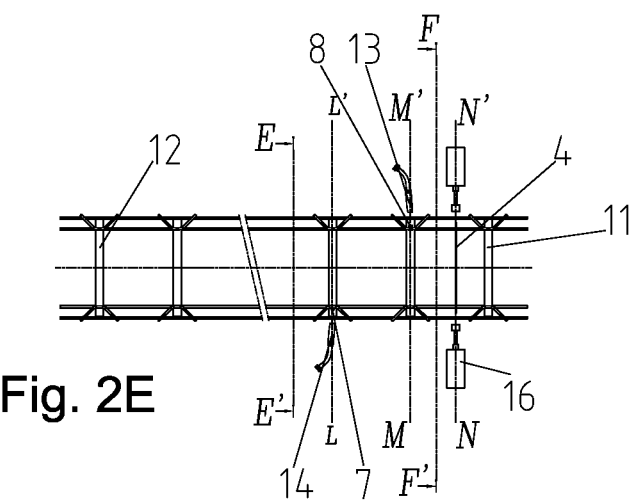
Figure 2F:
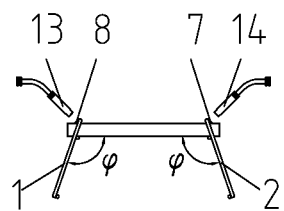
Figure 7A:
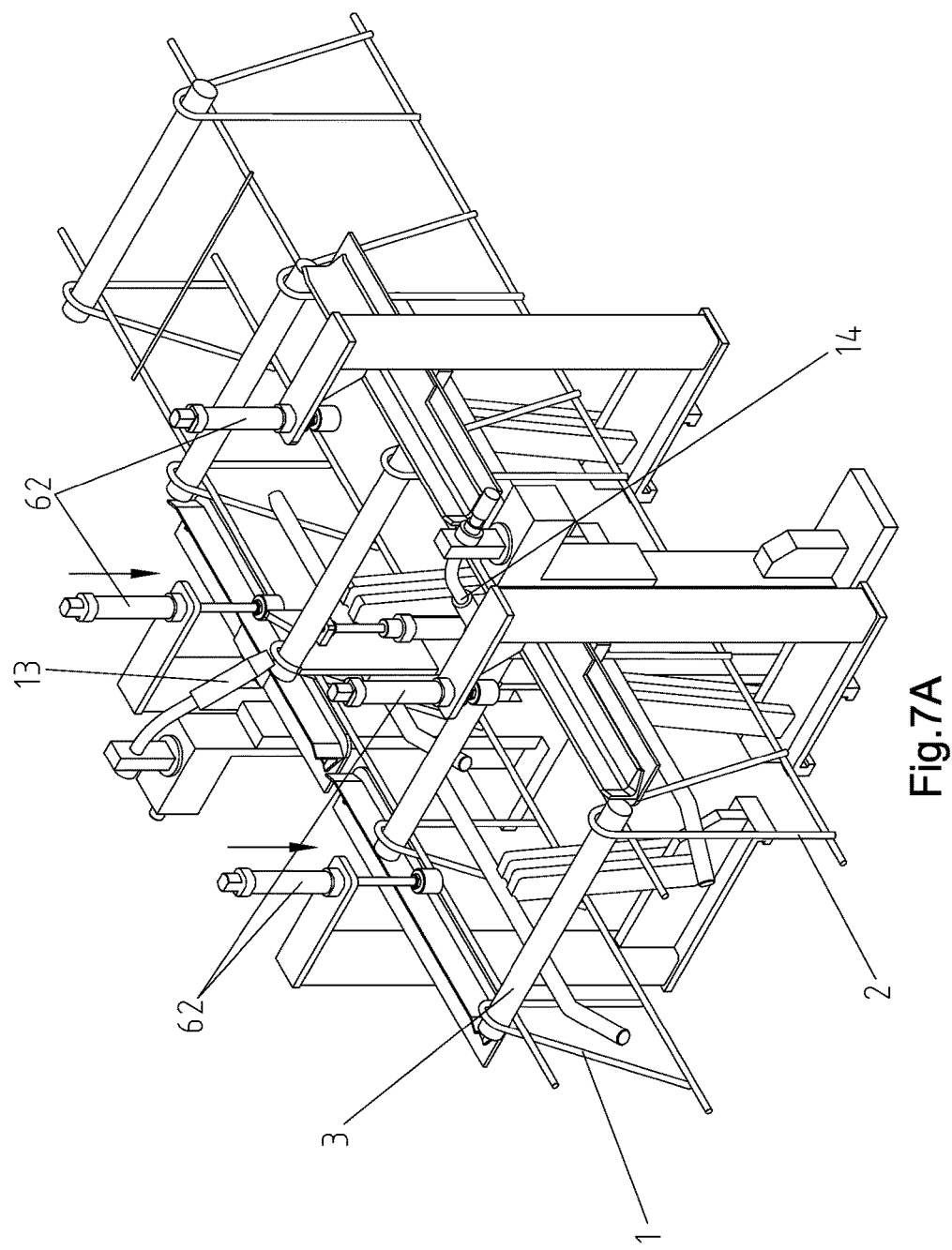
FIG. 7A—an elevation view depicting details of the dowel rod welders.
Figure 7B:
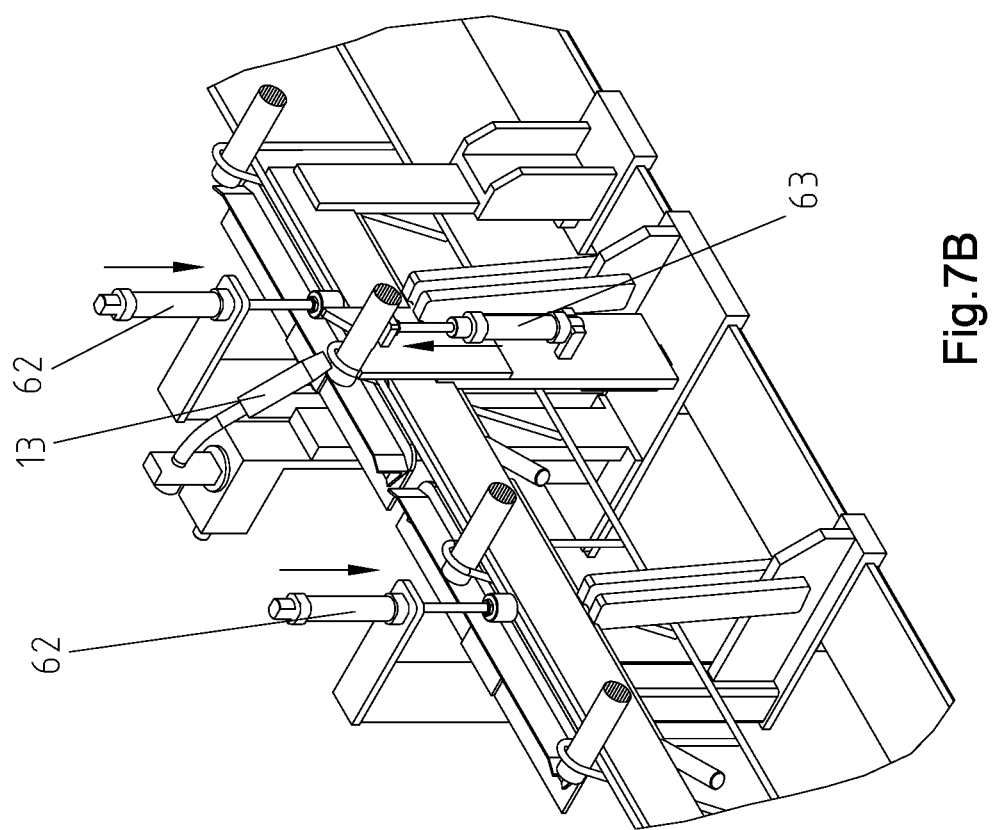

In subsequent processing, with reference to schematic FIGS. 2D-2F, the rods 3 are alternately welded at position MM' with the side component 1 and at position LL' with the side component 2. In the corresponding non-schematic views FIGS. 7A-7C, the welding head 13 is stationary and welds only every second rod 3 on the first side component 1 at position MM'. The same holds for the welding head 14 which welds on the second side component 2 at position LL' only each second rod 3 that has not previously been welded by the other welding head 13. Thus, each dowel rod 3 is welded with only one dowel side component 1, 2. The welding heads 13, 14, one unit at each side, receive current from respective welding machines. During the welding phase the dowel side components 1, 2 have acquired the desired inclination angle φ relative to the rods 3 and maintain it because of guides 90 as depicted in FIG. 7D and magnified in FIGS. 6A-6B. Further considering FIGS. 7D, 7B, and 7A, during the welding phase each dowel side component 1,2 is pressed downwards via its longitudinal wire 5 by the action of cylinders 62, while simultaneously the rod 3 to be welded is pressed upwards by the air cylinders 63, as depicted in FIG. 7C. Thus the welding conditions are fully defined and the rod 3 is welded on the corresponding dowel component. The welding at the opposed dowel components 1, 2 happens in the same manner.

Figure 2G:
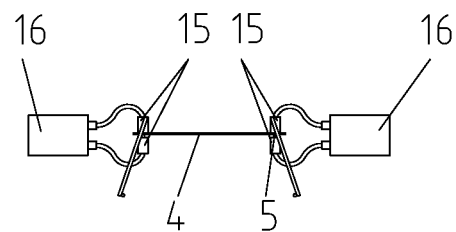

With further reference to schematic FIGS. 2E, 2G and to FIGS. 8B-8C, the transverse rods 4 are welded on the longitudinal wires 5 of the dowel side components 1, 2, at selected positions along the length of the dowel basket 9, with resistance welding at position NN'. The welding electrodes 15 are found on the beam 66 which is seated on joint 67, and they are moved by the action of air cylinder 68. With the action of air cylinder 68, the welding electrodes 15 are transferred to the welding location so as to contain the longitudinal wire 5 and the transverse tie wire 4. Subsequently, with the action of an air cylinder 69 the movable electrode is pressed on the stationary electrode and electric current originating from the welding transformer 16 fluxes through the contact area.

Figure 8A:
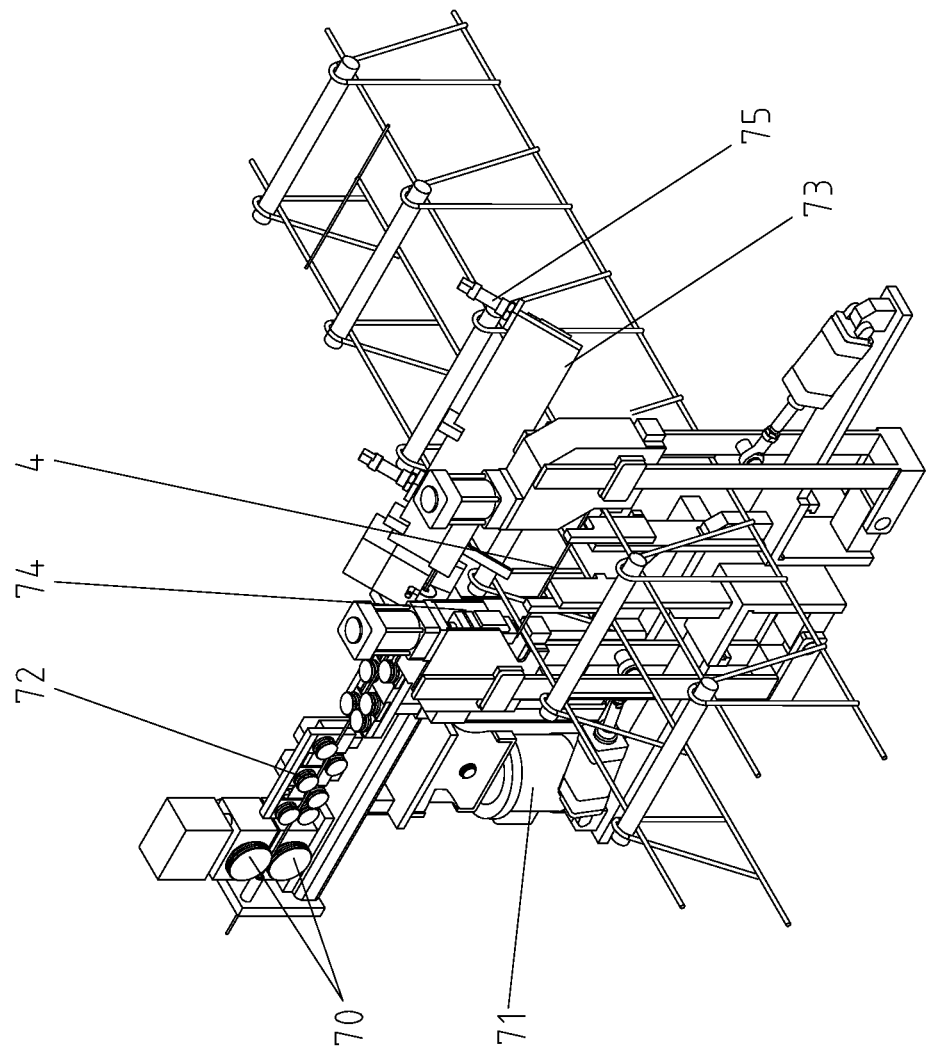
FIG. 8A—a detailed elevation view of the transverse tie wire feeding and welding arrangement.

There is a unit for the production and placement of the transverse wire 4 on the longitudinal wires of the dowel side components 1, 2. Considering FIG. 8A, the transverse wire 4 originates from a supply and is pulled by a pair of advancement rollers 70 driven by motor 71. The transverse wire 4 passes through the straightener 72 and is pushed to the wire collector 73 through the cutter 74. From the wire collector 73 the transverse wire 4, after cutting at cutter 74, is taken by the push rods 75 that also deposit it on the longitudinal wires 5 upon which it is welded, as depicted in FIGS. 8B-8C. However, in variations, the transverse wire 4 may alternatively be precut and be supplied to the welding position NN' via a feeder.

Figure 11C:
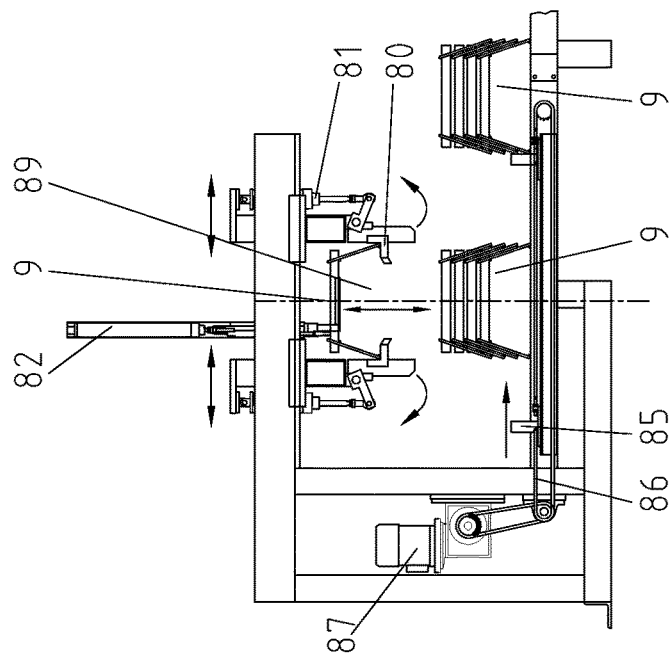
FIG. 11C—an end view of details of stacking mechanisms for prepared dowel baskets.
Figure 11B:
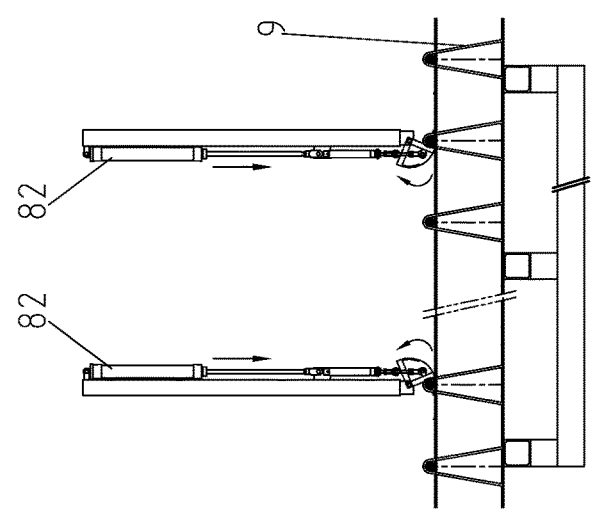
Figure 11A:
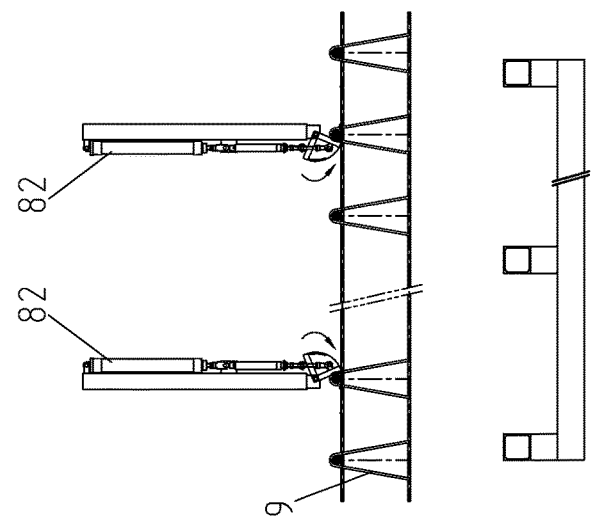
FIG. 11A—a first side view of details of stacking mechanisms for prepared dowel baskets.

Turning to FIGS. 10,11C, 12A-12B, with the conclusion of welding in phase B, the assembled dowel basket 9 may be transported towards a storage collector 89 by the push arm 76 which is driven by a motor 77 through a chain 78. As depicted in FIGS. 12-12B, the push arm 76 is seated on a joint 79 with a stop on one side so as to be able to push the dowel basket 9 towards its final position in the storage collector 89 without, however, being able to push the dowel basket 9 when returning to its initial position. As seen in FIG. 11C, the storage collector 89 has a grab 80 arrangement, and these grabs 80 open and close under the action of air cylinder 81 and simultaneously are transported up and down with the action of air cylinder 82. The dowel basket 9 is taken by the grippers 80 which, by the action of cylinders 82, deposit it at a deposit position on top of the already produced dowel baskets 9 in a storage stacking, as depicted in FIG. 11C. When a sufficient number of dowel baskets 9 are deposited, the push arms 85 are moved by chains 86 with the action of motor 87 and transport the dowel baskets to a loading location.

In use of this exemplary version, the guides 61 may be transferred relative to the machine 21 axis XX' so as to be adjusted to the dimensions of the dowel basket 9. Furthermore, the welding heads 13, 14 and the welding location FF' for the transverse wires 4 may be transferred relative to the machine 21 axis and locally adjusted so as to weld best.

The operation of the exemplary dowel basket 9 assembly system is as follows: In phase A two dowel side components 1, 2 are placed on the entry guides 61 so that the first receiver opening 6 is located at the feeding line KK' for rods 3. The guide 51 goes up to its position with the energization of air cylinder 53 and in following, the first rod 11 is introduced in the receivers 6 of the dowel side components 1, 2.

The carrier 23 is already in a position to receive the first rod 11; its gripper 27 is low, the air cylinder 30 is energized and the gripper 27 is raised so as to be able to receive the rod 11. With the energization of air cylinder 28 the gripper 27 tightens on the first dowel rod 11 and grips the first rod 11. Subsequently, air cylinder 53 is deenergized, guide 51 retreats lower. The carrier 23 transports the dowel side components 1, 2 according to the formation step of dowel basket 9, and in each step there is introduced one rod 3 from the feeding mechanism for rods so that with continuous stepwise advancements all of the dowel rods 3 are introduced to the dowel side components 1, 2. With the end of phase A this carrier 23 releases and leaves the intermediate product and is relocated to receive the first dowel rod 11 of the subsequent to-be-produced basket.

At this point, the second carrier 33 receives the semi-finished product with its gripper 37 restraining the last-introduced rod 12. As the carrier 33 pushes the semi-finished product towards phase B welding, the side components 1,2 pass through guides 90 and are rotated to the desired angle so as to have inclination φ relative to the rods 3. This transport halts for the welding of one transverse tie wire 4 at position NN', or for the welding of rods 3 with the shaped wires 10 at positions LL' and MM'. In this manner, with stepwise advancement motions there is completed the welding of the dowel rods 3 and the transverse wires 4.

With the end of phase B the carrier 33 pushes the produced dowel basket 9 towards the storage collector 89. The gripper 37 of the carrier 33 is deenergized and descends, and the carrier 33 returns to its starting positions to receive a new semi-finished product. In the phase C, the push arm 76 pushes the prepared dowel basket to the stacking position with the action of motor 77. There, with the action of grippers 80 and cylinders 82 the dowel basket is stacked on the already produced ones. With the stacking of a desired number of dowel baskets, they are transferred by the push arms 85 via the action of motor 87 to the position of receipt.

It should be understood that the operations of the machine 21 are advantageously controlled from a central computer where its operations are programmed.

Considering exemplary methods according to the invention, as seen in FIGS. 1A-1D, dowel baskets 9 are formed of dowel side components 1,2 lying in relative symmetry to one another with inclination φ relative to the dowel rods 3 and from rods 3 on the neighboring components. Considering FIGS. 2E-2G, the dowel rods 3 are welded alternately on the dowel side components 1, 2, each dowel rod being welded only on one of the opposed dowel side frames 1, 2, so that each of the side frame components 1, 2 with the dowel rods 3 that are welded on it may be shifted relative to the opposed cooperating side frame component 1, 2. For ease of transport and handling of the products, transverse wires 4 are welded upon the longitudinal wires 5 of the dowel side components preferably at least at two positions along the length of the dowel basket 9, so that the dowel basket be stiffened for handling.

The side components 1,2 include formed wires 10 that are welded upon at least one longitudinal wire 5. The formed wires 10 dispose a curved opening 6 above the longitudinal wires 5, with suitable dimensions so as to permit passage of a rod 3 through the openings 6 with tolerance when the side components 1,2 are in inclined arrangement relative to dowel rods 3. The diameters of wires 5, 10, the form of the shaped wires 10, the mutual distances among the shaped wires 10, and the length of the side component 1,2 are alterable sizes. The side components 1, 2 are situated symmetrically with inclination φ relative to the rods 3. The angle φ and the spacing between the side components are also alterable sizes.

The rods 3 may be of cylindrical form as depicted in FIG. 1B, or orthogonal form generally, or prismatic form, or triangular form as in FIG. 1C. The dimensions of the rods 3, dimensions of the cross section, and length are all alterable sizes.

The side dowel components are the same in cases where the dowel rods 3 are prismatic bodies for example as in FIG. 1B. The side dowel components 1, 2 may be mutually different FIG. 1C, with different welded shaped wires 10 and rods 3 which are not prismatic bodies.

As was previously discussed, the dowel baskets 9 are produced from side components 1, 2 which are produced primarily in automated machines. The present invention presents methods and systems for automating production of dowel baskets 9 from individual components of which they are composed, that is from dowel side components 1, 2, dowel rods 3, and stabilization wires 4.

According to an exemplary method of the invention the assembly of the dowel baskets 9 is implemented in phases, FIGS. 2A-2G. In a first phase A two side components 1, 2 are situated symmetrically along axis XX'. As schematically depicted in FIG. 2B, dowel rods 3 may be introduced into the dowel basket 9 at a location KK'. During their introduction, the dowel rods 3 are placed so as to result in given distances of their ends from the side components. Furthermore, the side dowel components 1, 2 are placed initially so that the first dowel rod receiver 11 is located on axis KK'. With continuous suitable advancements of the side components 1, 2 the dowel rods 3 are fed to the feed location KK' and an intermediate product is produced including side components 1, 2 and the rods 3 placed upon them.

As depicted in FIGS. 2D-2G, in a second phase B the following processes take place. The dowel side components 1, 2 are rotated relative to the axis of the respective longitudinal wires 5 so as to assume the preselected inclination φ. There are two positions, the position LL' where with electrical welding there is welded one rod 3 with the dowel component 2 producing a weld bead 7, and the position MM' where with electrical welding there is welded another rod 3 with the opposed dowel component 1 producing the weld bead 8. In this manner, the rods 3 are alternately welded with the side dowels 1, 2 so as to maintain the internal angle φ, as detailed in FIG. 2F. With continuing advancements of the sides 1, 2 towards the welding heads 13, 14 the dowel rods 3 are welded inside the receivers 6 of the side components. The tie wires 4 are welded on the longitudinal wires 5 of the side dowel components 1, 2 at position NN'. In each dowel basket 9 there may be welded at least two transverse wires 4, so as to impart to the basket 9 a rigidity suitable for transport.

Figure 2H:
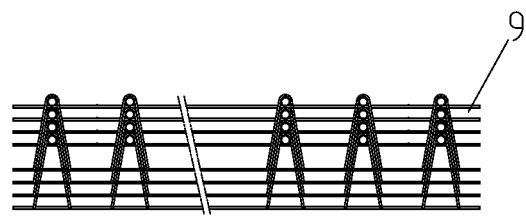
Figure 2I:
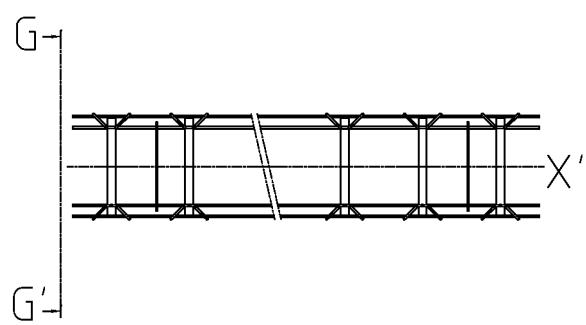
Figure 2J:
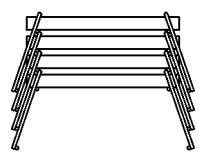

As depicted in FIGS. 2H-2J, in a third phase C the assembled dowel baskets 9 are stacked one on the other, view GG'.

The exemplary production procedure for the dowel basket 9 may be further understood as follows: The dowel side components 1, 2 are introduced and advanced stepwise towards the line of introduction KK' of rods 3, where transverse rods 3 are introduced in the openings 6 of the side components 1, 2. According to exemplary methods, these introduced components may be of any whatsoever form, such as cylindrical bodies or tetragonal or orthogonal rods, or prismatic bodies of any cross section. The introduced components may also be plates of triangular or other form. The side components 1, 2 are advanced stepwise towards the line of introduction KK' and with continuous advancements and introductions of rods 3 an intermediate product is produced from the assembled side components 1, 2 with the rods 3 inserted in the openings 6 of the side components 1, 2. According to an exemplary method the feeding of rods 3 occurs at least at one feeding line KK' in connection to the productivity of the system. However, with the feeding at two positions it is possible to achieve double productivity in phase A, while with the simultaneous feeding at more than two locations there is achieved correspondingly multiplied productivity.

With the end of introduction of rods 3 into the dowel side components 1, 2, the dowel components with the rods are transported towards the welding positions LL' and MM'. The side components 1,2 are rotated so as to acquire the predetermined inclination φ relative to the rods 3. According to exemplary methods, at phase B, the dowel side components' suitable inclination φ may be implemented either passively through suitable guides, or actively through the action of mechanisms. In following, with continuous advancements and weldings the rods 3 are welded alternately and in succession with the dowel components 1, 2 via electrical welding. According to exemplary methods the welding of rods 3 on the side components 1, 2 may occur simultaneously at more than two positions for an increase of the productivity. Conversely, the welding may occur from only one welding machine that welds first one side and subsequently the other. It should be understood from this description that in exemplary methods, the welding of transverse dowel rods 3 with the longitudinal rods 5 of the dowel side components 1, 2 may be welding with deposition of material, or resistance welding, or any other method of welding.

Considering FIGS. 2E and 2G, at position NN' there is preferably welded a transverse wire 4 on the longitudinal wires 5 at least at two locations along the length of the dowel basket 9. The wires 4 which are welded at position NN' may be straightened, cut, and welded, or may be precut and supplied to the welding line via a feeder. In this manner, the dowel basket acquires rigidity. According to exemplary methods, the welding of wires 4 with the longitudinal wires 5 of the dowel components is made with resistance welding or deposition welding or with any other method of welding. Phase B may be executed while simultaneously phase A is executed on the next-to-be assembled dowel basket, and while the previously assembled dowel baskets are stored and stacked.

The dowel baskets 9 that have been produced are transported towards the storage position C, where they are stacked one basket upon the other.

It was previously explained that according to exemplary methods the side components 1, 2 may be produced independently from the assembly of the dowel basket 9, and may be transported and fed to the phase A. However, it should be understood that they may be produced simultaneously at a machine and be automatically fed synchronously towards the basket assembly machine.

It should be understood in the context of the preceding discussion that the present invention is not limited in any manner to the described and drawings-depicted implementations, but may be realized in many forms and dimensions without abandoning the region of protection of the invention. For example, in implementations of the invention the materials that are used and also as well the dimensions of particular elements may be according to the demands of a particular construction. Thus, in closing, it should be noted that the invention is not limited to the abovementioned versions and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not necessarily limiting upon the scope of the present invention. The scope of the present invention is defined by the appended claims, including known equivalents and unforeseeable equivalents at the time of filing of this application.

REFERENCE LABELS 1,2 side components
3 rod
4 transverse tie wires
5 longitudinal wires
6 receiver openings in side components
7,8 weld bead
9 dowel basket
10 shaped wires
11 first rod
12 last rod
13,14 welding heads
15 welding electrodes
21 metallic structure
22 linear guides
23 carrier
24 motor
25 reducer transmission
26 gear
27 gripper
28 air cylinder
29 joint
30 air cylinder
33 second carrier
34 motor
35 reducer transmission
36 gear
37 gripper
38 air cylinder
39 joint
40 air cylinder
45 stationary plate
46 guides
47 plate
48 side guide
49 push rod
50 air cylinder 51 receiver guide for rods
52 guide
53 air cylinder
61 guides
62 cylinders
63 air cylinders
66 beam
67 joint
68 air cylinder
69 air cylinder
70 advancement rollers
71 motor
72 straightener
73 wire collector
74 cutter
75 push rods
76 push arm
77 motor
78 chain
79 joint
80 grippers
81 air cylinders
82 air cylinder
85 push arms
86 chains
87 motor
89 storage collector
90 guides
φ angle of inclination
KK' feeding location/line
LL' location of welding
MM' location of welding
NN' tie wire welding position
XX' longitudinal axis

What is claimed is:

1. A dowel basket production system comprising:
entry guides configured to guide dowel side components;
a first carrier, said first carrier having a first gripper configured to grasp a dowel rod of a dowel basket;
a dowel rod feeding mechanism;
a second carrier configured to push a semi-finished product towards welding;
said second carrier having a second-carrier gripper;
rotation guides configured to rotate dowel side components to have inclination relative to dowel rods;
welding heads configured to weld dowel rods in an alternate manner to dowel side components whereby each dowel rod is welded only to one of two mutually opposed dowel side components;
a transverse wire unit configured to produce and place transverse wire on longitudinal wires of dowel side components; and
welding electrodes configured to weld transverse wire on longitudinal wires of dowel side components.

2. The dowel basket production system as claimed in claim 1, wherein:
said entry guides are selectively adjustable to selected dowel basket dimensions.

3. A dowel basket production system as claimed in claim 1, further comprising:
a push arm configured to transport assembled dowel baskets; and,
storage collector for assembled dowel baskets transported by said push arm.

4. A dowel basket production system as claimed in claim 3, further comprising:
said storage collector having a grab arrangement configured to deposit dowel baskets in storage stacking.

5. A dowel basket production system as claimed in claim 1, further comprising:
inclination mechanisms configured to impart selected inclination angles to said rotation guides, said rotation guides being active guides.

6. A dowel basket production system as claimed in claim 1, further comprising:
an air cylinder connected to energize said first gripper; and,
another air cylinder connected to selectively raise and withdraw said first gripper respectively to and from dowel rods of a dowel basket.

7. A dowel basket production system as claimed in claim 1, further comprising:
an air cylinder connected to energize said second-carrier gripper; and,
another air cylinder acting to selectively raise and withdraw said second-carrier gripper respectively to and from dowel rods of a dowel basket.

8. A dowel basket production system as claimed in claim 1, further comprising:
a receiver configured to receive dowel rods fed from said dowel rod feeding mechanism.

9. A method for dowel basket production comprising steps of,
in a first phase:
introducing dowel side components on dowel side component guides;
feeding with continuous stepwise advancements transverse dowel rods through openings of the dowel side components;
respectively rotating, to a desired inclination relative to the transverse dowel rods, the dowel side components respectively on their respective longitudinal wires' respective axes;
in a second phase;
welding in alternate manner the dowel side components with the transverse dowel rods via with stepwise advancements;
welding transverse wires on the dowel side components' longitudinal wires; in a
third phase;
transporting prepared dowel baskets;
stacking prepared dowel baskets; and,
executing said first, said second, and said third phases simultaneously in a production space.

10. A method for dowel basket production as claimed in claim 9, further comprising step of:
feeding transverse dowel rods through openings of the dowel side components at more than one position.

11. A method for dowel basket production as claimed in claim 9, further comprising step of:
feeding transverse dowel rods through symmetrically situated respective openings of the dowel side components.

12. A method for dowel basket production as claimed in claim 9, further comprising step of:
feeding transverse dowel rods through openings of the dowel side components that are of different form.

13. A method for dowel basket production as claimed in claim 9, further comprising step of:
feeding transverse dowel rods that are selected from at least one of the group of transverse dowel rods consisting of prismatic bodies, triangular forms, and non-prismatic forms.

14. A method for dowel basket production as claimed in claim 9, further comprising step of:
  welding in alternate manner the two dowel side components with the transverse dowel rods simultaneously for the two sides.

15. A method for dowel basket production as claimed in claim 9, further comprising step of:
  passively via guides respectively rotating, to a desired inclination relative to the transverse dowel rods, the dowel side components relative to their respective side component longitudinal wires' respective axes.

16. A method for dowel basket production as claimed in claim 9, further comprising step of:
  actively via the action of mechanisms respectively rotating, to a desired inclination relative to the transverse dowel rods, the dowel side components relative to their respective side component longitudinal wires' respective axes.

17. A dowel basket production system comprising:
  dowel side component receivers configured to guide dowel side components;
  a dowel rod feeder;
  a semi-finished product carrier;
  at least one dowel side component rotator configured to rotate dowel side components to relative inclinations with respect to dowel rods;
  at least one welding head configured to weld dowel rods to dowel side components;
  a transverse wire unit configured to place transverse wire on longitudinal wires of dowel side components; and,
  at least one welder configured to weld transverse wire with longitudinal wires of dowel side components.

18. A dowel basket production system as claimed in claim 17, further comprising:
  a storage collector for assembled dowel baskets.

19. A method for dowel basket production comprising steps of:
  in a first phase:
  introducing dowel side component via a dowel side component guide;
  feeding with continuous stepwise advancements transverse dowel rods through openings of the dowel side component;
  respectively rotating, to a desired inclination relative to the transverse dowel rods, a respective dowel side component on the respective dowel component longitudinal wire's respective axis;
  in a second phase:
  welding in an alternate manner the dowel side component with the transverse dowel rods;
  welding at least one transverse wire on a dowel side component longitudinal wire; and
  executing said first and said second phases simultaneously in a production space.

20. A method for dowel basket production as claimed in claim 19, further comprising the steps of:
  in a third phase:
  transporting prepared dowel baskets;
  stacking prepared dowel baskets; and,
  executing said first, said second, and said third phases simultaneously in a production space.

* * * * *